Patented May 12, 1925.

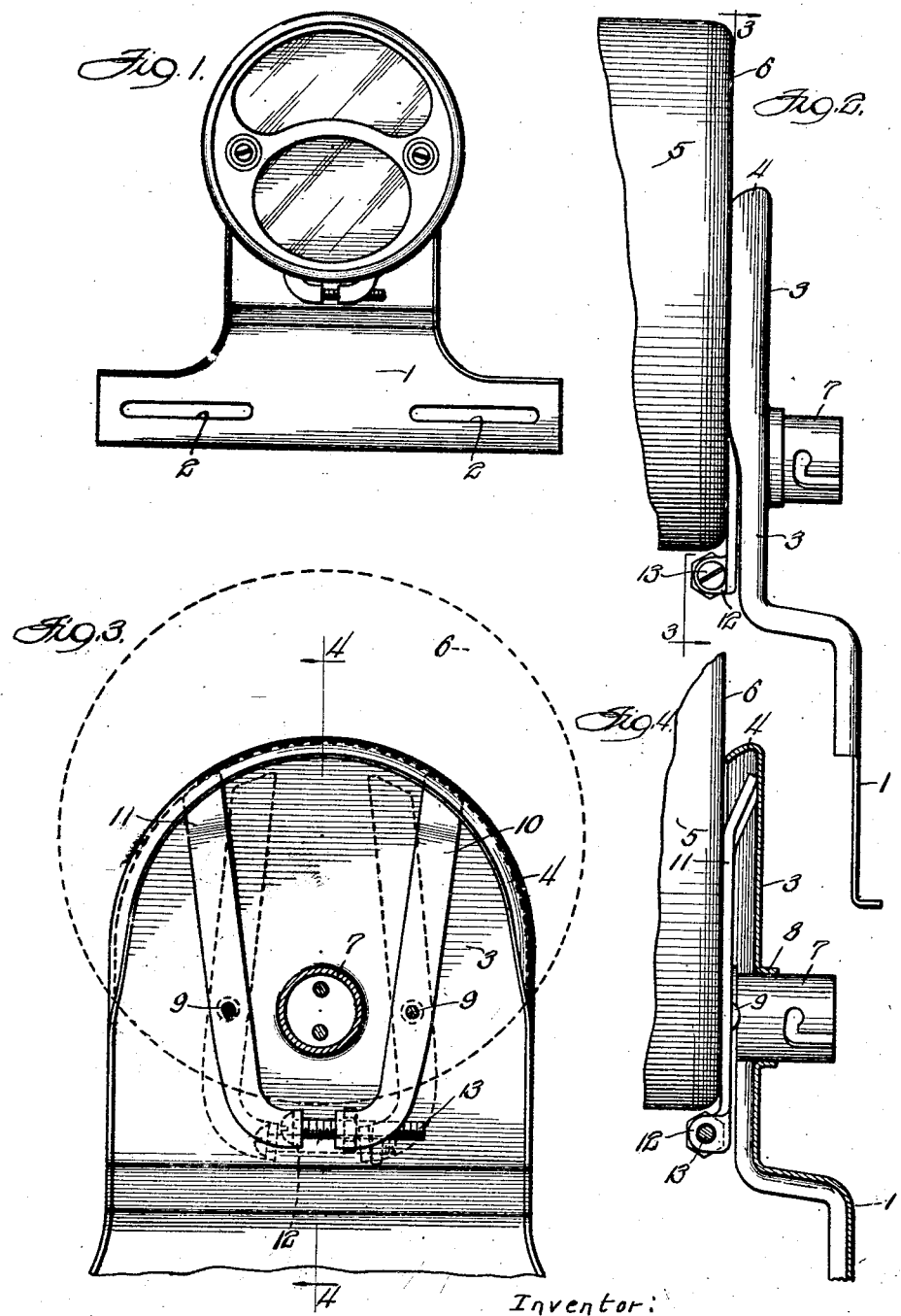

1,537,435

UNITED STATES PATENT OFFICE.

JAMES J. GOUGH, OF CHICAGO, ILLINOIS, ASSIGNOR TO EDMUNDS & JONES CORPORATION, OF DETROIT, MICHIGAN, A CORPORATION OF NEW YORK.

SUPPORT FOR AUTOMOBILE LAMPS.

Application filed November 13, 1924. Serial No. 749,631.

*To all whom it may concern:*

Be it known that I, JAMES J. GOUGH, citizen of the United States, residing at Chicago, in the county of Cook and State of Illinois, have invented certain new and useful Improvements in a Support for Automobile Lamps; and I do hereby declare the following to be a full, clear, and exact description of the invention, such as will enable others skilled in the art to which it appertains to make and use the same.

My invention relates to means for supporting lamps, and in one of its immediate commercial aspects is particularly applicable to the securing of rear lamps to lamp brackets attached to vehicles.

Heretofore, it has been customary for the automobile manufacturers to provide each car with a bracket adapted to support a rear lamp in a desirable position, and it has likewise been customary for the lamp manufacturers to construct each rear lamp with bolts projecting through the back of the lamp casing and adapted to secure the lamp to such a bracket. To allow for a ready interchanging of the lamps, which is particularly desirable in view of the gradually changing requirements of the various State laws and in view of the developing of new and advantageous types of such lamps, the spacing of the bolts projecting from the lamp casings and the spacing of the bolt holes provided in the brackets on the cars should all be uniform. This is not true in practice, and even with the same makes of brackets and the same makes of lamps, irregularities in the manufacturing often lead to such variations as to require machine work on the brackets before the lamps can be attached to them.

My present invention aims to overcome these difficulties by providing the supporting bracket and the lamp casing with cooperating parts which will readily compensate for variations in the manufacture, while also readily permitting an attaching and detaching of the lamp from the bracket. More particularly, my invention provides a supporting bracket adapted to be attached to a vehicle or the like and including a projecting flange which is contracted towards its free edge. Then it provides the lamp casing with movably mounted members adapted to hook under the said flange, and provides both the supporting member and the lamp with other interengaging parts for preventing bodily movement of the lamp with respect to the supporting member in a direction which would release the said hooking engagement. It also provides simple means for moving the hooking members into their holding position and for retaining them in this position.

Since my invention is immediately applicable to combination tail and stop lamps as employed on automobiles, I am describing and illustrating a corresponding embodiment in the following specification and in the accompanying drawings, from which further and more detailed objects of my invention will also appear. In the drawings, Fig. 1 is an elevation of a supporting member in the form of a bracket, showing a rear lamp attached to the same.

Fig. 2 is a fragmentary and enlarged side elevation of the same, taken from the right hand of Fig. 1.

Fig. 3 is a fragmentary vertical section taken along the zig-zag line 3—3 of Fig. 2, with the relative position of the lamp casing indicated by a dotted circle.

Fig. 4 is a vertical section taken centrally of Fig. 3 along the line 4—4.

In the embodiment of the drawings, the supporting bracket is shown as having a vertical base portion 1 provided with the usual slots 2 for receiving bolts whereby the base of the bracket is bolted to a suitable portion of the frame of the car. This supporting bracket also has an upper and vertical portion 3 offset from the lower portion 1 and provided along its substantially semi-circular upper end with a forwardly directed flange 4. This flange is inclined towards an axis extending at right angles to the upper bracket portion 3 through the center of the said semi-circular upper end of that portion, thereby contracting the forward or free edge of the flange 4 to a diameter less than that of the flat upper end portion 3, so that the upper part of the supporting bracket is of a substantially and inverted J-shaped section.

The tail lamp illustrated in connection with this supporting member has the usual substantial cylindrical side wall 5 and the usual flat back 6, and is also shown as having the usual socket shell 7 projecting rearwardly from it to provide for the attaching of a plug carrying the wires for the circuit connections. To allow for this socket shell, I provide the upper portion 3 of the supporting bracket with a corresponding perforation which desirably is bordered by a flange 8 through which the socket shell slidably extends, thereby affording an accurate guide as to the height of the lamp casing with respect to the supporting bracket, and hence preventing a bodily downward movement of the lamp casing away from the said flange 4.

Pivoted to the back of the lamp casing through pivot pins 9 are a pair of levers 10 and 11, the pivot pins 9 being desirably at opposite sides of the socket shell 7. The upper arms of the levers 10 and 11 are of such length that their tips will extend under the flange 4 when their upper ends are moved away from each other, but will be clear of this flange when moved in the opposite direction to a position such as that indicated by dotted lines in Fig. 4. The lower arms of both of the levers 10 and 11 extend beyond the bottom of the lamp casing and desirably have perforated portions 12 bent at right angles to the back of the lamp casing and underhanging the latter. Extending loosely through the perforations in these lower arm tips 12 is a bolt 13, which bolt desirably has one lateral face of its nut disposed so close to the adjacent main portion of one of the arms, namely the portion which extends substantially parallel and close to the back 6 of the lamp casing, as to lock the nut against rotation.

When the bolt is loosened as shown in dotted lines in Fig. 4, the two levers 10 and 11 can be swung manually to a position such as shown in dotted lines in that figure, thereby causing the upper ends of these arms to be within a radius smaller than that of the contracted free edge of the flange 4. With the arms in this position, the socket shell 7 can readily be slid partly through the perforation bordered by the guide flange 8 on the supporting member, so as to dispose the lamp as shown in Fig. 4. Then when the bolt is tightened, the upper ends of the levers 10 and 11 are swung away from each other, and, since their pivot pins 9 are laterally spaced from the center of the semicircular flange 4, this movement also moves the upper arm tips to greater distances from the said flange center. Consequently, these upper arm tips are forced behind the overhanging flange and, by continuing a tightening of the screw, these tips are moved into the largest diametered portion of the bore of the flange so as to cause the flange to hook tightly over them. While the arms are thus being moved, the downward thrust due to their engagement with the flange tends to move the arms bodily downward. This thrust is transmitted through the pivot pins 9 to the lamp casing and hence to the socket shell 7, and is resisted by the collar 8 through which this socket shell extends. Consequently, I secure a tightly locked and exceedingly firm connection between the lamp and the supporting bracket. Moreover, since each of the levers 10 and 11 can move independently of the other when the bolt is loose, the arrangement of these arms permits them to compensate automatically for any variations such as may occur either in the lamp or in the supporting bracket during their manufacture. At the same time, a subsequent loosening of the bolt 13 will again permit the lever 10 and 11 to be manually moved to its releasing position, thereby permitting the lamp to be detached and replaced if desired.

However, while I have illustrated my invention in connection with a certain type of lamp, I do not wish to be limited in this respect, it being obvious that the same arrangement might be employed with any lamp, so long as this has hooking arms of a suitable size pivoted to it. Neither do I wish to be limited to the particular shape of the bracket here shown as forming the supporting member, nor to other details of the construction and arrangement thus disclosed, it being obvious that many modifications might be made in the same without departing either from the spirit of my invention or from the appended claims.

I claim as my invention:—

1. The combination with a lamp, of a support having a hook-formed portion projecting toward the lamp, cooperating means on the lamp and the support for preventing transverse movement of the lamp away from the said portion of the support, and a latching member carried by the lamp and movable so as to move a portion of the said member into or out of the said hook-formed portion of the support.

2. The combination with a lamp, of a support having a hook-formed portion projecting toward the lamp, cooperating means on the lamp and the support for preventing transverse movement of the lamp away from the said portion of the support, and a pair of latching members pivoted upon the lamp and movable so as to bring a part of each member into or out of the said hook-formed portion of the support.

3. The combination with a lamp, of a support having a hook-formed portion projecting toward the lamp, cooperating means on the lamp and the support for preventing transverse movement of the lamp away from the said portion of the support, a pair of latching members pivoted upon the lamp and movable so as to bring a part of each member into or out of the said hook-formed portion of the support, and means for simultaneously and forcibly moving the latching members to bring the said part of each latching member into the said hook-formed portion of the support.

4. The combination with a lamp, of a support having a part disposed behind the lamp and bordered at one edge by a flange directed toward the lamp and inclined at an acute angle to the main portion of the said part of the support, latching means mounted on the lamp and movable into and out of a position in which a part of the latching means is disposed between the flange and the portion of the support adjacent to the flange, and means on the support engaging a part of the lamp to prevent a bodily movement of the lamp parallel to the said portion of the support and away from the said flange.

5. A lamp and support as per claim 4, in which the latching means comprise a pair of levers pivoted to the lamp on spaced pivots and extending between the back of the lamp and the said part of the support, and means for simultaneously moving the levers.

6. A lamp and support as per claim 4, in which the latching means comprise a pair of levers pivoted intermediate their ends to the lamp and each having one end disposed for entering between the flange and the portion of the support back of the flange when these ends are moved away from each other, and a bolt connecting the lower ends of the levers and adapted when tightened to move the levers in the said relative direction.

7. The combination with a lamp having a socket shell projecting from its back, of a support having a bore through which the socket shell slidably extends, the support having an edge portion recurved to form a flange directed obliquely toward the back of the lamp and toward the socket shell, a pair of latching levers pivoted to the back of the lamp and having end portions adapted to be swung behind the flange and into thrusting engagement with the juncture of the said edge portion and flange, and means for simultaneously moving the two levers to swing their tips into the said disposition.

8. A lamp and support combination as per claim 7, in which the said edge and flange are arcuate, and in which the pivotal axes of the two levers are respectively at opposite sides of the axis of the said arcuate edge and flange.

9. A lamp and support combination as per claim 7, in which each lever has its main portion extending behind the lamp substantially parallel to the part of the support which has the said arcuate edge portion, and also has a portion extending at right angles to the said part of the support and provided with a perforation; in combination with a bolt extending through the said perforations in the two levers for forcibly moving both levers.

10. A lamp and support combination as per claim 7, in which each lever has the end portion adjacent to the said flange sloping toward the portion of the support adjacent to the flange.

11. A lamp and support combination as per claim 7, in which the lever tips adjacent to the said flange are curved substantially concentric with the flange when these tips are in their said thrusting engagement.

12. The combination with a lamp having a socket shell projecting from its back, of a support having a bore through which the socket shell slidably extends; the support having a portion disposed behind and parallel to, but spaced from, the back of the lamp; the said portion having an arcuate upper edge bordered by a flange directed obliquely toward the back of the lamp and toward the axis of the said arcuate edge; two levers pivoted to the back of the lamp and having upwardly directed arms terminating in tips adapted to be swung into and out of the space between the flange and the said portion of the support according as the levers are moved in one direction or the other; each lever having a downwardly directed arm terminating in a lower portion underhanging the lamp; and threaded means extending through the said lower end portions of the levers for positively moving both levers in the direction causing their upper arm tips to swing into the said space.

Signed at Chicago, Illinois, November 10th, 1924.

JAMES J. GOUGH.